United States Patent
Swift

(10) Patent No.: US 7,343,216 B2
(45) Date of Patent: Mar. 11, 2008

(54) APPLYING FOLIAGE AND TERRAIN FEATURES TO ARCHITECTURAL SCALED PHYSICAL MODELS

(76) Inventor: Lawrence W. Swift, 12316 Rivers Edge Dr., Potomac, MD (US) 20876

( * ) Notice: Subject to any disclaimer, the term of this patent is extended or adjusted under 35 U.S.C. 154(b) by 0 days.

(21) Appl. No.: 11/484,944

(22) Filed: Jul. 12, 2006

(65) Prior Publication Data

US 2007/0027660 A1    Feb. 1, 2007

Related U.S. Application Data

(60) Provisional application No. 60/698,708, filed on Jul. 13, 2005.

(51) Int. Cl.
*G06F 17/50* (2006.01)
*G06F 19/00* (2006.01)
(52) U.S. Cl. ............ 700/118; 700/117; 700/119; 703/1; 427/81
(58) Field of Classification Search ........ 700/117–119; 703/1; 427/81
See application file for complete search history.

(56) References Cited

U.S. PATENT DOCUMENTS

2003/0014224 A1*  1/2003  Guo et al. ............... 703/1
2005/0196542 A1*  9/2005  Cooper ................ 427/402
2006/0004476 A1*  1/2006  Ferren et al. ........... 700/117

OTHER PUBLICATIONS

"Battlefield Visualization on the Responsive Workbench"—Durbin et al, IEEE visualization '98 conference proceedings, IEE 1998.*

* cited by examiner

*Primary Examiner*—Michael D. Masinick
(74) *Attorney, Agent, or Firm*—Roberts Mardula & Wertheim, LLC

(57) ABSTRACT

The method for assembling an architectural site model facilitates repeated placement and removal of foliage to the model. The site model is constructed as an upper shell portion and a lower base portion. Model foliage is attached to the shell portion. The upper shell portion of the site model is configured for removable attachment to the lower base portion. Thus, removal of the shell from the site model also allows the foliage to be removed from the site model in one motion.

12 Claims, 3 Drawing Sheets

APPLYING FOLIAGE AND TERRAIN FEATURES TO ARCHITECTURAL SCALED PHYSICAL MODELS

CROSS REFERENCE TO RELATED APPLICATIONS

This application claims priority benefit under 35 U.S.C. § 119(e) from provisional application No. 60/698,708, filed Jul. 13, 2005. The 60/698,708 application is incorporated by reference herein, in its entirety, for all purposes.

This application also relates to co-pending applications by the same inventor of this application and entitled "Building of Scaled Physical Models" (application Ser. No. 11/484,945, filed Jul. 12, 2006), "Identification of Terrestrial Foliage Location, Type, and Height for Architectural Models" (application Ser. No. 11/485,083, filed Jul. 12, 2006), and "Determination of Scaling for Architectural Models" (application Ser. No. 11/485,084, filed Jul. 12, 2006).

FIELD OF THE INVENTION

The invention relates generally to architectural processes of building physical models to develop and communicate building design concepts. In particular, the invention relates to a process for preparing a physical foliage representation relating to a site model, attaching miniature foliage elements to an architectural model in such a manner as to allow for easy and repeated placement and removal of the foliage to the site model in order to facilitate evaluation of the model.

BACKGROUND OF THE INVENTION

Architects, builders, and real estate developers have been building scaled physical representations (models) of their design concepts for centuries to help them both develop their design and communicate that design to their clients. These models typically involve the fabrication of a building model (typically a residential house or commercial building), the fabrication of a site model of the property's terrain, and the placement of miniature facsimile trees and/or shrubs on the site model.

The building model is a scaled three dimensional model that represents the architect's design of the proposed building. These building models have traditionally been fabricated by hand using cardboard-type materials ("chipboard" is a popular medium) by architects and/or model builders using X-ACTO® knives and glue to manufacture a miniature scaled model of the building design. Other materials can also be used such as plastics or metals, which are often cut to size using laser cutters.

The site models are typically scaled topographical representations of the land on which the building is to be constructed. The typical approach to constructing these site models is to cut out and stack-up cardboard layers, with each cut out layer representing a land elevation contour.

Once the building model and site model have been integrated together to form a combined model, the final assembly stage of the combined model is the placement of miniature foliage representing trees and/or shrubs. The miniature foliage may be simply decorative (i.e., randomly place on the site model with no correlation to the actual location of plants), or it may be a representation of the actual positioning of foliage that is intended to occupy the site with the building as part of an architect's landscape design.

The traditional methodology for attaching model foliage as scaled representations of trees and/or shrubs to the model has been to either permanently glue the Foliage to the Site Model or wedge/jam the Foliage into holes or receptacles formed in the site model. Site surveys are sometimes conducted to establish foliage location, however, often this activity does not occur resulting in haphazard model foliage placement. This traditional approach of permanently securing the foliage to the site model is shown in FIG. 1.

The problem with this traditional approach is that the model foliage placement on the site model portion of the architectural model often obscures views of design features of the building model portion of the architectural model. When this happens it can be difficult to evaluate the building model without removing the foliage from the site model. However, since the foliage is often either permanently attached or difficult to remove and later replace, there is no convenient method for easily evaluating the overall model iteratively both with and without foliage.

SUMMARY OF THE INVENTION

According to embodiments of the present invention a method is provided for assembling a site model portion of an architectural which facilitates repeated placement and removal of miniature foliage to the model. The method includes construction of a site model with an shell portion and a base portion. The foliage is then attached to the shell portion. The shell portion of the site model is configured for removable attachment to the lower base portion. Thus, removal of the shell from the site model also allows the foliage to be removed from the site model in one motion leaving only the lower base. The foliage is replaced on the site model by replacement of the shell onto the lower base.

The shell portion need not cover the entire surface of the base portion and, according to an alternate embodiment, the shell portion may be a top layer portion that is formed of one or more layers of the site model that are not permanently fixed to a base portion formed of the lower layers of the site model.

One aspect of the present invention is to facilitate detachment of foliage from a site model portion of an architectural model.

Another aspect of the present invention is to facilitate detachment of terrain features (e.g., rocks, surface grading adjacent a building foundation) from a site model portion of an architectural model.

Still another aspect of this invention is to provide for an efficient and convenient method for attaching foliage to a site model which allows for easy and rapid removal and replacement of the foliage with respect to the site model.

It is a further aspect of the present invention to provide a way of visualizing subsurface features of an architectural model. Instead of the shell portion being on the top of the site model, as an alternative the shell is at the bottom of the site model. When implemented as a bottom layer below the main body of the site model, the bottom layer bears subsurface features (e.g., utility structures, an emergency shelter, a cellar, a tunnel, a garage) that are obscured from view by grading of the site surface.

A first embodiment of the present invention is a method for manufacturing an architectural site model. The method includes a step of constructing a base portion of the site model having a contour that is reduced from the site model contour by a predetermined shell thickness. The method also includes a step of constructing a shell portion of the site model, the shell portion being configured for removable attachment to the base portion and having a close fit to the base portion. Foliage is attached to the shell portion, and the shell portion is placed onto the base portion to form a topographically-scaled representation of a land site on which a building is to be constructed.

A second embodiment of the present invention is a method for manufacturing a scaled architectural model. The method includes steps of storing electronic architectural design data in a building model file, and modifying the building model file to ensure compliance with manufacturing requirements of additive manufacturing equipment, thereby producing a conforming building model file. The method further includes steps of storing electronic site contour data in a site model file and modifying the site model file to ensure compliance with manufacturing requirements of subtractive manufacturing equipment, thereby producing a conforming site model file. The conforming site model file is modified to reduce contour height by a predetermined shell thickness and to produce a modified conforming site model file. The conforming site model file is also modified to have a bottom contour corresponding to the reduced contour height of the modified conforming site model file to produce a shell file containing data for a shell of the predetermined shell thickness. The physical scales of the conforming building model file and the modified conforming site model file are compared to ensure the two files are of substantially the same scale. The method further includes steps of transmitting the conforming building model file to the additive manufacturing equipment to produce a building model, transmitting the modified conforming site model file to the subtractive manufacturing equipment to produce a base portion of the site model, and transmitting the shell file to the subtractive manufacturing equipment to produce an shell portion of the site model. The building model is integrated with the base portion of the site model. Model foliage is fixed to the shell portion, and the shell portion is integrated onto the base portion to produce the site model.

A third embodiment of the present invention is a method for manufacturing an architectural site model. The method includes steps of storing electronic site contour data in a site model file and modifying the site model file to ensure compliance with manufacturing requirements of subtractive manufacturing equipment, thereby producing a conforming site model file. The method also includes steps of modifying the conforming site model file to reduce contour height by a predetermined shell thickness and to produce a modified conforming site model file and transmitting the modified conforming site model file to the subtractive manufacturing equipment to produce a base portion of the site model. A shell portion of the site model is formed having a thickness that is approximately the predetermined shell thickness. Model foliage is fixed to the shell portion, and the shell portion is integrated onto the base portion to produce the site model.

A fourth embodiment of the present invention is an architectural site model. The architectural site model includes a site model base portion having an upper contour and a site model shell portion. The site model shell portion has a substantially uniform shell thickness, has a close fit to the base portion, and is configured for removable attachment to the base portion. Model foliage is attached to the shell portion.

DETAILED DESCRIPTION

Figure 1:
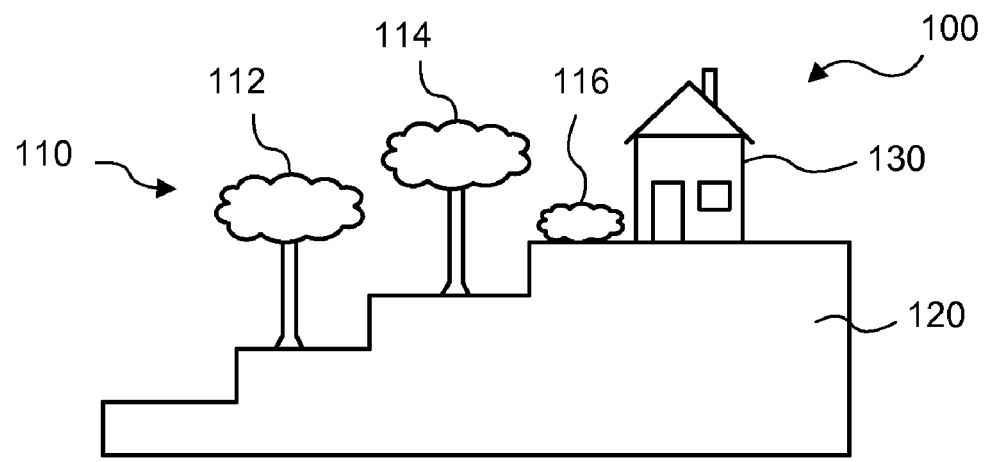
FIG. 1 illustrates a conceptual drawing showing an architectural model with foliage permanently secured to the site model according to the traditional approach for modeling foliage.

One embodiment of the present invention is a process by which model foliage can easily be detached and re-attached to a site model portion of an architectural model. This is in contrast to the traditional method of attaching foliage 110 to a site model portion 120 (refer to FIG. 1) of an architectural model 100, with miniature trees 112, 114 and shrubs 116 being attached to the site model 120 with glue, mechanical fasteners, or an interference fit provided by drilling a hole and jamming the miniature tree base into the hole.

A method according to the present invention avoids the difficulty of viewing and analysis of the building model 130 if the foliage 110 is permanently attached on the site model 120 and obscures the view of key elements of the building model 130 and cannot be easily moved out of the way. Removing and re-attaching the miniature trees 112, 114 and/or shrubs 116 that have been attached to the site model 120 via traditional methods can be extremely difficult and would likely ruin the foliage aspect of the model 100.

Figure 2:
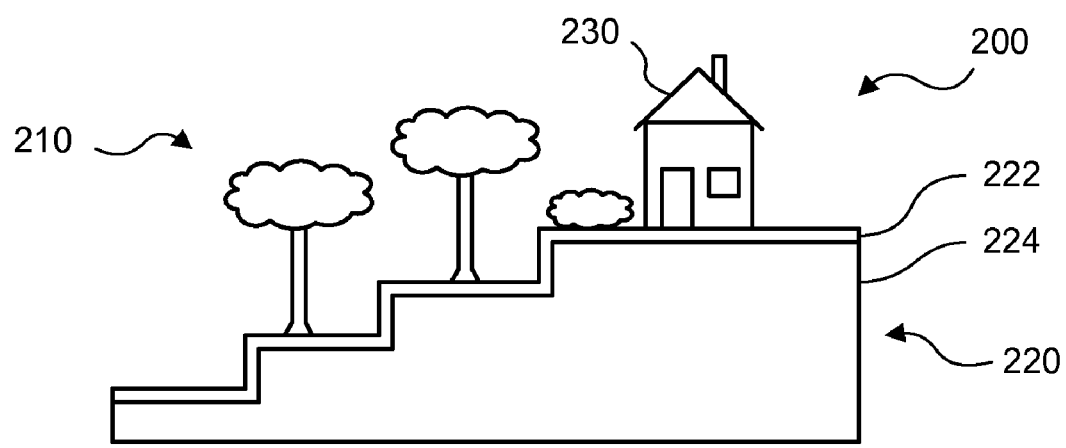
FIG. 2 illustrates a conceptual drawing showing an architectural model with a site model prepared according to an embodiment of the present invention with a shell and base portions joined together.

Referring to FIG. 2, a site model prepared according to one embodiment of the present invention alleviates the problem associated with conventional methods of attaching model foliage. The present invention uses a shell structure 222 that fits closely over the contours of a base 224 for the site model 220. The thickness of the shell 222 added to the thickness of the base 224 of the site model 220 is equal to the contours of a traditional scaled site model 120.

Figure 3:
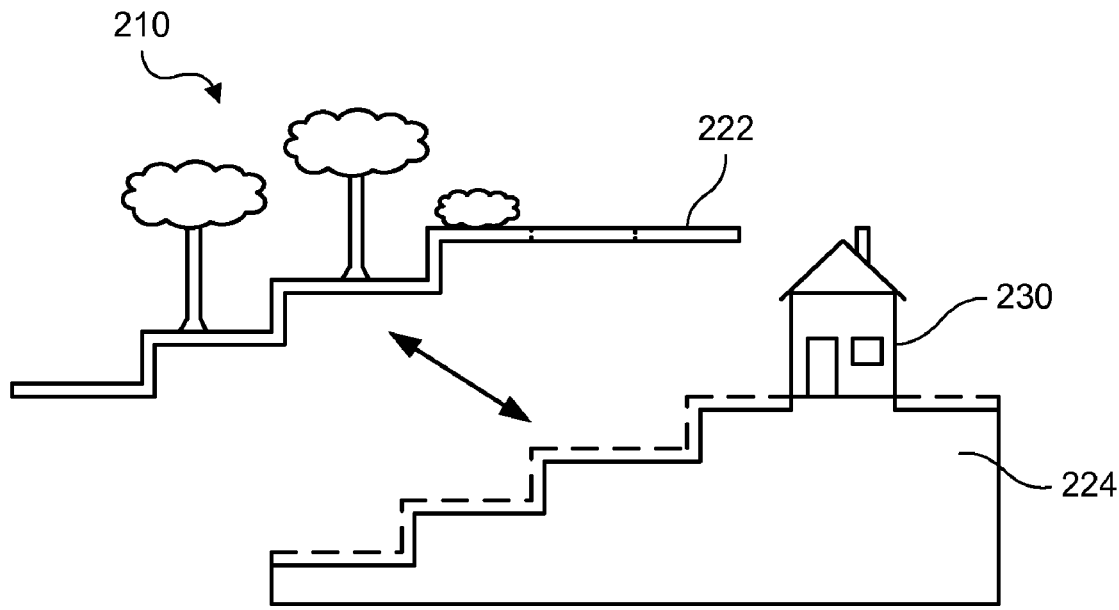
FIG. 3 illustrates a conceptual drawing showing the architectural model of FIG. 2 with the shell portion detached from the base portion to remove the foliage from around the building model.

Referring to FIG. 3, an advantage of adding this shell 222 to the base 224 of the site model 220 is that it allows a user to, in one motion, remove or re-attach all of the foliage 210 by simply moving the shell 222 (upon which the foliage 210 is attached) off or back onto the base 224.

Figure 4:
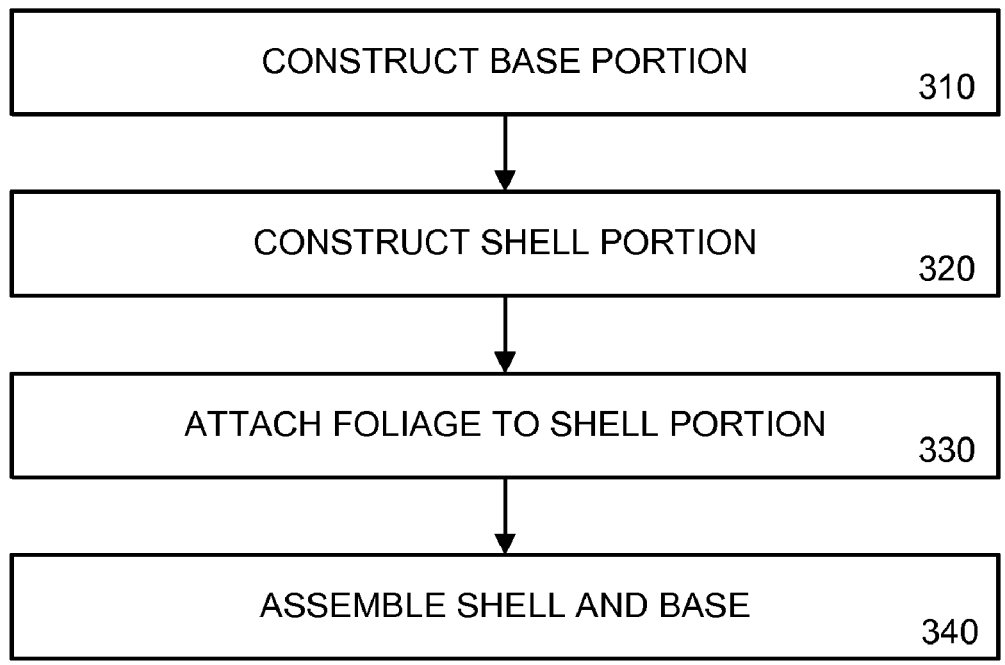
FIG. 4 illustrates a flowchart for a process of making a site model according to an embodiment of the present invention.

Referring to FIG. 4, a process of making a site model according to an embodiment of the present invention is illustrated. The base 224 is constructed 310 using any suitable method (an automated CNC machining process, for example) with a contour that is reduced in height by the thickness of the shell 222.

A shell 222 as described above, with model foliage 210 attached, can be manufactured 320 in a number of differed ways. One example, of an approach to manufacturing the shell is to use vacuum forming. As another example, thermoforming can be used to manufacture the shell. Yet another example of a suitable method to manufacture the shell is to use a heated extruded plastic sheet and that is formed over the base portion of the site model. Each of these exemplary methods is suitable to create a contoured shell, but practice of the present invention is not limited to these exemplary embodiments. Any manufacture method that is capable of producing a relatively thin shell that fits over a contoured based is suitable to practice the invention. Another suitable approach to forming a shell according to the present invention is to mill or route out the shell using computer numerically controlled (CNC) machining techniques.

When embodied as a top (or bottom) layer portion rather than as a constant thickness shell, formation of the layer portion can be as uncomplicated as not permanently affixing together a pair of adjacent layers of laminar material being built up to form the site model.

After both the base 224 and the shell (or layer) 222 have been constructed, foliage 210 is attached 330 to the shell 222 in a manner that duplicates existing foliage or in a manner that depicts desired foliage configuration and the shell is assembled 340 onto the base 224 to form the complete site model 210.

By forming the site model as a base with a close fitting removable shell with foliage attached 330 to the shell, evaluation of the overall architectural model is aided. It is easier to analyze the entire model and to communicate the design concepts of the building model when it can easily be viewed alternately with foliage in place and without foliage.

The invention as illustrated above may be used with architectural models that have been made using otherwise conventional techniques. The invention may also be practiced as a modification of the novel way of building architectural models as described and claimed in co-pending patent application Ser. No. 11/484,945 (filed Jul. 12, 2006), which claims priority from provisional application No. 60/698,706, is entitled "Building of Scaled Physical Models," and which is incorporated by reference herein for all purposes.

Figure 5:
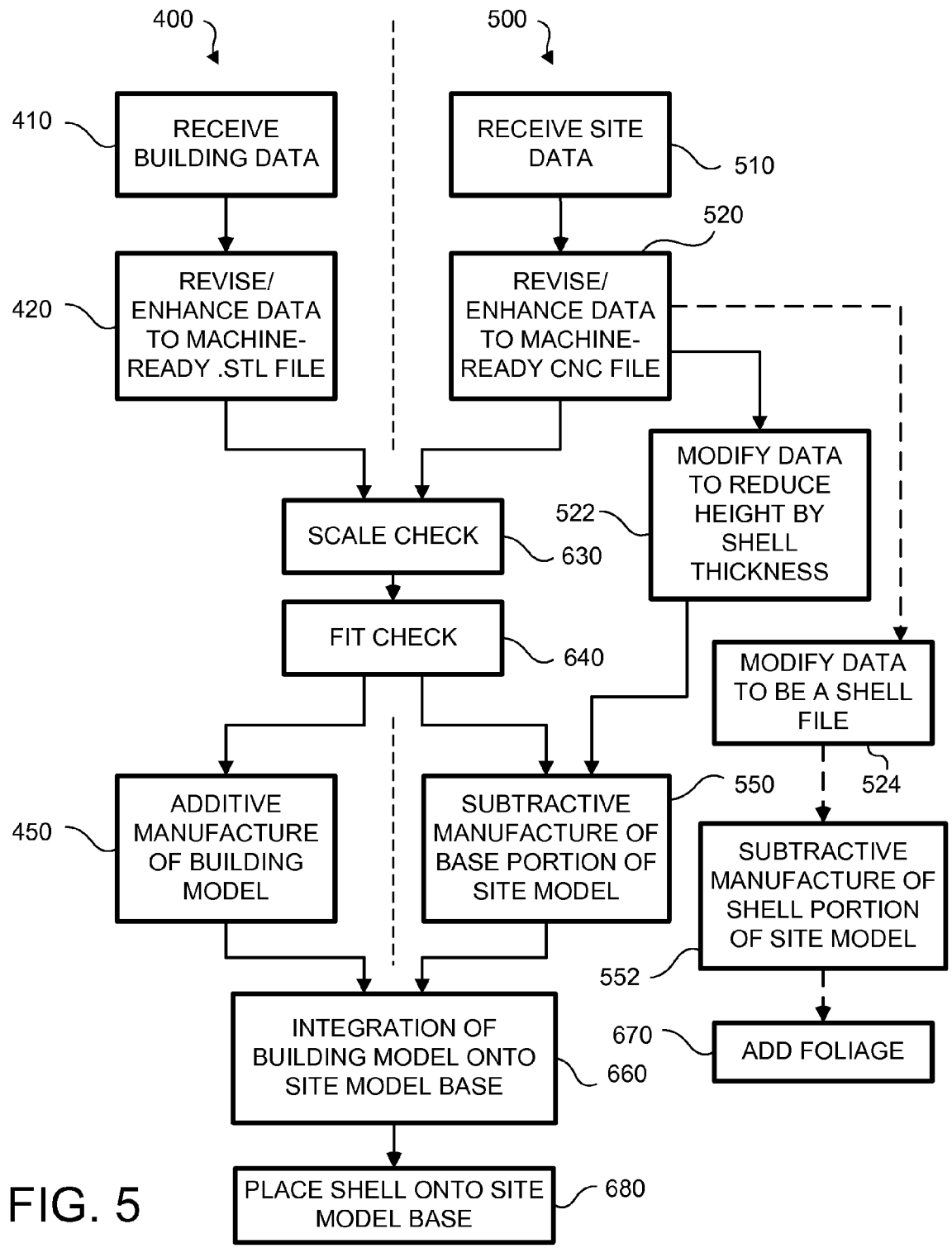
FIG. 5 illustrates a flowchart for a process of automated manufacture of a site model according to an embodiment of the present invention.

Referring to FIG. 5, a flowchart illustrates a process according to the present invention that represents a modified version of the process disclosed in the "Building of Scaled Physical Models" application. The flowchart is for a process by which architectural electronic design data can be used to build scaled physical models. The process has a process flow 400 for making the building model, which is mostly separate from a process flow 500 for making the site model. The building model process flow 400 and the site model process flow 500 are conceptually parallel to one another and may be executed substantially contemporaneously with one another.

The building model process flow 400 begins the reception 410 of building model data from an architect or designer. The format the building model data is received in is any format known to those skilled in the art so long as it can be transformed or translated into a format that is compatible with CAD software. For example paper format blueprints can be scanned and captured to be placed into an electronic form. Non-3D formats are translated into a 3D format either by conversion or design translation. Thus, 2D CAD files, 3D CAD files, and .stl files can all be received into and utilized for a process according to this invention. For ease of description, the process as described below will presuppose that the building model data has been either delivered in, or has been converted into, the standard stereolithography output format which is known in the CAD art and for which the files have the file extension ".stl" (a standard output format for almost all 3D CAD software programs).

A building model .stl file received from the architect contains a complete description of the building model design, and is output from the architect's 3D CAD software package. Once received, the .stl file is examined to ensure suitability for manufacturing in additive manufacturing equipment, which is commonly referred to as "rapid prototyping" equipment. Three dimensional printers are additive manufacturing machines suitable for implementing the invention, and are commercially available as products manufactured by Z Corp, Stratasys, and 3D Systems.

A search of the data file is conducted for anomalies that would prevent successful manufacturing of the building model "part." Any such anomalies identified are modified or repaired 420 so that manufacture of the model can be accomplished. Examples of repairs that are typically effected include making parts not be "water tight" (i.e., eliminating trapped negative volumes), and insuring that no features are below minimal manufacturing tolerances. Commercially available software programs are available for this purpose, such as Materialise's Magics, or proprietary analysis software may be used. Additional changes to the electronic model (e.g., changing the size of railings or fence posts) may be useful and can be accomplished with the use of 3D CAD programs. Examples of 3D CAD programs that can be successfully used to do this are Rhino FormZ, AutoCAD, and SolidWorks. As an alternative, .stl manipulation programs (such as Magics) can be used to make the changes to revise the building model data file.

Once the building model .stl file is determined to be suitable for manufacturing, a check 630 is made to ensure that the site model and the building model are of the same scale. For example, a check is made to confirm that both are "16th scale," which means that 1 inch represents 16 feet at full scale. Additionally, a fit check 640 is made to make sure that the building model can be attached to the site model.

If both these checks are met, the building model .stl file is submitted 450 to the additive manufacturing equipment to be built. The process this equipment performs is referred to as an "additive" process, since the part (in this case the building model) is typically built up one layer at a time by the rapid prototyping manufacturing equipment. Various types of media (e.g., plastic or plaster) are used by the equipment to make the building models, and the media may be colored depending on the manufacturer and rapid prototype equipment selected.

Various post processing efforts are performed, depending on the additive manufacturing equipment selected. For example, when using a Z510 model three dimensional printer manufactured by Z Corp., once the building model is built up and has had suitable time to dry, the part is excavated from the Z510 machine and "de-powdered" to remove all excess material. The de-powdering is done because the Z510 uses a plaster-like powder material as its medium to build the parts it makes. The de-powdered building model is then "infiltrated" with any of a variety of waxes, urethanes, or resins, depending on the desired surface characteristics for the building model. Once infiltrated, the building model may be hand finished as necessary to ensure the desired look, quality and finish.

After any post processing efforts have been completed, the fabricated building model is ready to be attached 660 to the site model.

The site model process flow 500 can be performed in parallel to the building model process flow 400 to minimize overall process completion time.

The site model process flow 500 begins with the reception 510 of site model data from the architect or designer. The site model data can be in various formats. Either paper format (e.g., plats) or electronic format (e.g., 2D CAD files, 3D CAD files, .stl files, etc.) can be utilized in the process. In order to be manufactured, non-3D formats must be translated into 3D formats, either by conversion or design translation. For ease of description, the process as described below will presuppose that the site model data has been either delivered in, or has been converted into, the standard steriolithography output format which is known in the CAD art and for which the files have the file extension ".stl".

Once ready, the .stl file is converted 520 into a CAM program which can output a programming language (using any of various programming codes, e.g., G-code, M-codes, DNC conversational, or APT code) that is used by subtractive manufacturing equipment, such as a CNC machine tool (e.g., a CNC milling machine or a CNC routing machines. This conversion can be done with off-the-shelf conversion software programs such as ArtCAM by Delcam plc (www.artcam.com).

According to the present invention the site model process flow includes an additional step of modifying 522 the conforming site model file to reduce its profile by a small amount corresponding to the thickness of the shell.

Optionally, a step is added of modifying 524 the conforming site model file to produce a shell file with the upper contours of the site model (essentially the same site model shape as before except that the bottom is hollowed out). Creating a shell file 524 is optional and not required to practice this aspect of the invention. This step is optional in the sense that it is unnecessary if the shell is formed via one of the alternative methods discussed herein that do not involve subtractive manufacturing.

In creating the shell file 524, it is useful (but not required) to further modify the shell surface data to provide CNC instructions to drill holes that are appropriately sized and located for fixing points for model foliage. Identification of foliage type and location is preferably conducted via one or more processes as disclosed in co-pending application Ser. No. 11/485,083 (filed Jul. 12, 2006), which claims priority from provisional patent application No. 60/698,707, is entitled "Identification of Terrestrial Foliage Location, Type, and Height for Architectural Models," and which is incorporated by reference herein for all purposes. Alternatively, such data can also be gathered by direct observation and subsequently be entered into a data file that provides location and size data for hole drilling instructions.

Once the site model CNC program is determined 520 to be suitable for manufacturing and has been modified 522 to reduce height by the shell thickness, a scale check 630 is made to ensure that the site model and the building model are of the same scale. For example, if one is sized at "16$^{th}$ scale" (which means 1 inch on the model corresponds to 16 feet at full scale) the other will also need to be sized at that same 16$^{th}$ scale. Additionally, a fit check 640 is made to ensure that the building model can be attached to the site model. If these checks are met, the CNC program is submitted 550 to the subtractive manufacturing equipment for building of the base portion of the site model.

This manufacturing equipment is described as performing a "subtractive" process is that the part (in this case the site model) is created by taking material away from a block of material with milling or routing machinery. The site models can be made from various types of material, such as plastic modeling boards, Styrofoam, medium density fiberboard or blocks of wood.

When the subtractive manufacturing equipment completes formation of the base portion of the site model, it can then be hand finished as necessary to ensure the desired look, quality, and finish, after which the base portion 224 of the site model 220 is ready to be physically integrated 660 with the building model 230 (refer to FIGS. 2 and 3).

Another step according to this aspect of the invention is the manufacturing 552 of the shell portion. The step of manufacturing 552 the shell portion can be done using the subtractive manufacturing equipment to form the shell according to the shell file prepared in the step of modifying 524 the conforming site model file to produce a shell file. As an alternative (and to save time or avoid the need to use two subtractive manufacturing machines in tandem) the shell may be manufactured using any of the exemplary techniques discussed above or via other suitable processes.

At the ends of the building model process flow 400 and the site model process flow 500, these two process flows join together in a model integration process 660. Once the building model 230 and base 224 of the site model 220 are complete, these elements of the architectural model 200 are integrated together. This integration involves attaching the building model to the site model base and then securing 670 any foliage 210 (i.e. trees and shrubs) to the site model shell 222.

If the shell 222 optionally does not cover the entire upper surface of the base 224, foliage is also applied as needed to those parts of the base not covered by the shell.

To complete the site model 220, the shell 222 is placed 680 onto the base 224.

A system and method for applying foliage and terrain features to architectural scaled physical models has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. References to a specific time, time interval, or instantiation are in all respects illustrative and not limiting.

What is claimed is:

1. A method for manufacturing an architectural site model, the method comprising:
   constructing a base portion of the site model reduced from a contour of the site model by a predetermined shell thickness;
   constructing a shell portion of the site model, the shell portion being configured for removable attachment to the base portion and having a close fit to the base portion;
   attaching foliage to the shell portion; and
   placing the shell portion onto the base portion to form a topographically-scaled representation of a land site on which a building is to be constructed.

2. The method for manufacturing of claim 1, wherein constructing the base portion of the site model is performed by subtractive manufacturing.

3. The method for manufacturing of claim 1, wherein constructing the shell portion of the site model is performed by vacuum forming.

4. The method for manufacturing of claim 1, wherein constructing the shell portion of the site model is performed by thermoforming.

5. The method for manufacturing of claim 1, wherein constructing the shell portion of the site model is performed by forming a heated extruded plastic sheet over the base portion of the site model.

6. A method for manufacturing a scaled architectural model, the method comprising:
   storing electronic architectural design data in a building model file;
   modifying the building model file to ensure compliance with manufacturing requirements of additive manufacturing equipment, thereby producing a conforming building model file;
   storing electronic site contour data in a site model file;
   modifying the site model file to ensure compliance with manufacturing requirements of subtractive manufacturing equipment, thereby producing a conforming site model file;
   modifying the conforming site model file to reduce contour height by a predetermined shell thickness and to produce a modified conforming site model file;
   modifying the conforming site model file to have a bottom contour corresponding to the reduced contour height of the modified conforming site model file to produce a shell file containing data for a shell of the predetermined shell thickness;
   comparing physical scales of the conforming building model file and the modified conforming site model file to ensure the two files are of substantially the same scale;
   transmitting the conforming building model file to the additive manufacturing equipment to produce a building model;
   transmitting the modified conforming site model file to the subtractive manufacturing equipment to produce a base portion of the site model;
   transmitting the shell file to the subtractive manufacturing equipment to produce an shell portion of the site model;
   integrating the building model with the base portion of the site model;
   fixing model foliage to the shell portion; and
   integrating the shell portion onto the base portion to produce the site model.

7. A method for manufacturing an architectural site model, the method comprising:
   storing electronic site contour data in a site model file;
   modifying the site model file to ensure compliance with manufacturing requirements of subtractive manufacturing equipment, thereby producing a conforming site model file;
   modifying the conforming site model file to reduce contour height by a predetermined shell thickness and to produce a modified conforming site model file;
   transmitting the modified conforming site model file to the subtractive manufacturing equipment to produce a base portion of the site model;
   forming a shell portion of the site model having a thickness that is approximately the predetermined shell thickness;
   fixing model foliage to the shell portion; and
   integrating the shell portion onto the base portion to produce the site model.

8. The method for manufacturing of claim 7, wherein forming the shell portion of the site model comprises vacuum forming.

9. The method for manufacturing of claim 7, wherein forming the shell portion of the site model comprises thermoforming.

10. The method for manufacturing of claim 7, wherein forming the shell portion of the site model comprises forming a heated extruded a plastic sheet over the base portion of the site model.

11. An architectural site model comprising:
    a site model base portion having an upper contour reduced from a contour of the site model by a predetermined shell thickness;
    a site model shell portion having a substantially uniform shell thickness, the shell portion having a close fit to the base portion and being configured for removable attachment to the base portion;
    and model foliage attached to the shell portion.

12. The architectural site model of claim 11, wherein attachment of the shell portion to the base portion achieves a topographically-scaled representation of a land site.

* * * * *